Dec. 14, 1954
A. SCHMIDT, JR., ET AL
2,697,198
ELECTRIC CONTACT CONVERTER
Filed July 5, 1950
2 Sheets-Sheet 1
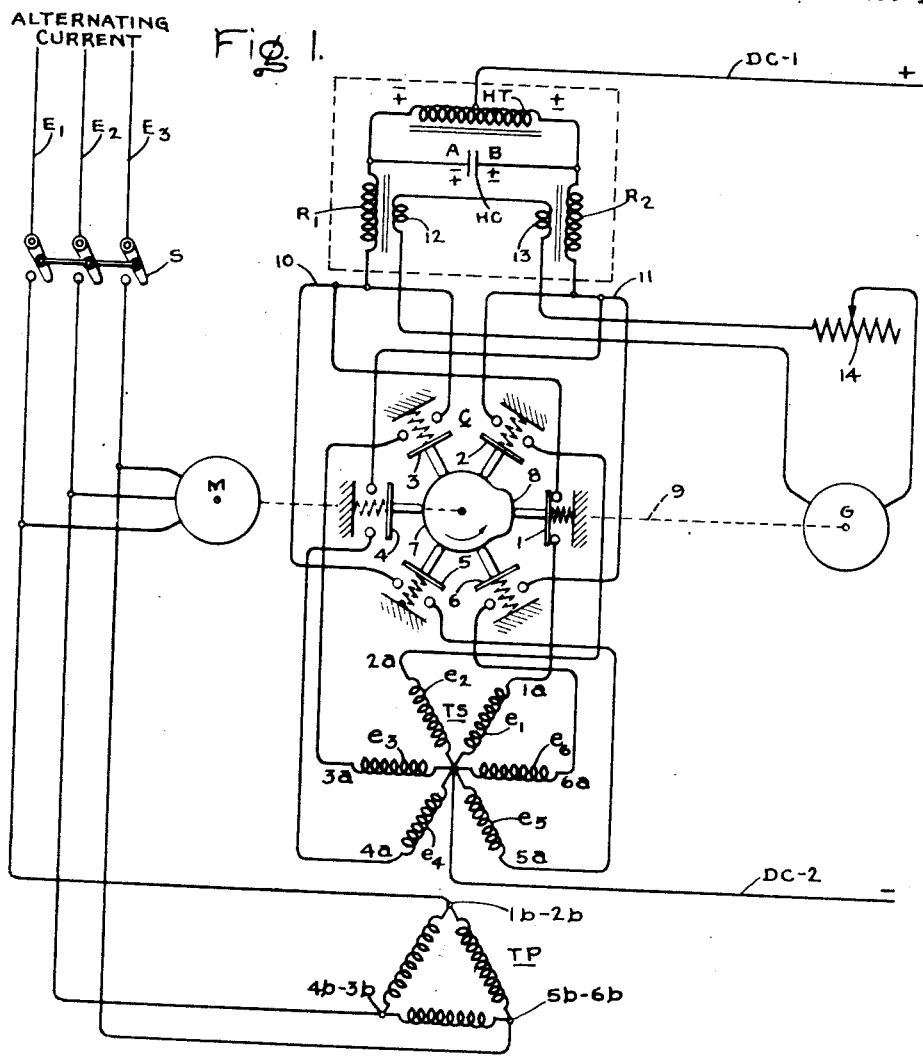
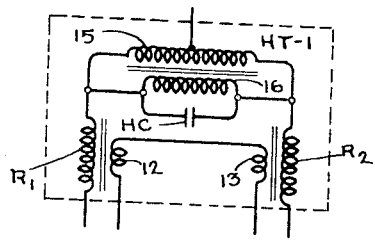
Inventors:
August Schmidt, Jr,
Charles H. Titus,
Clodius H. Willis,
by Ernest C. Britton
Their Attorney.

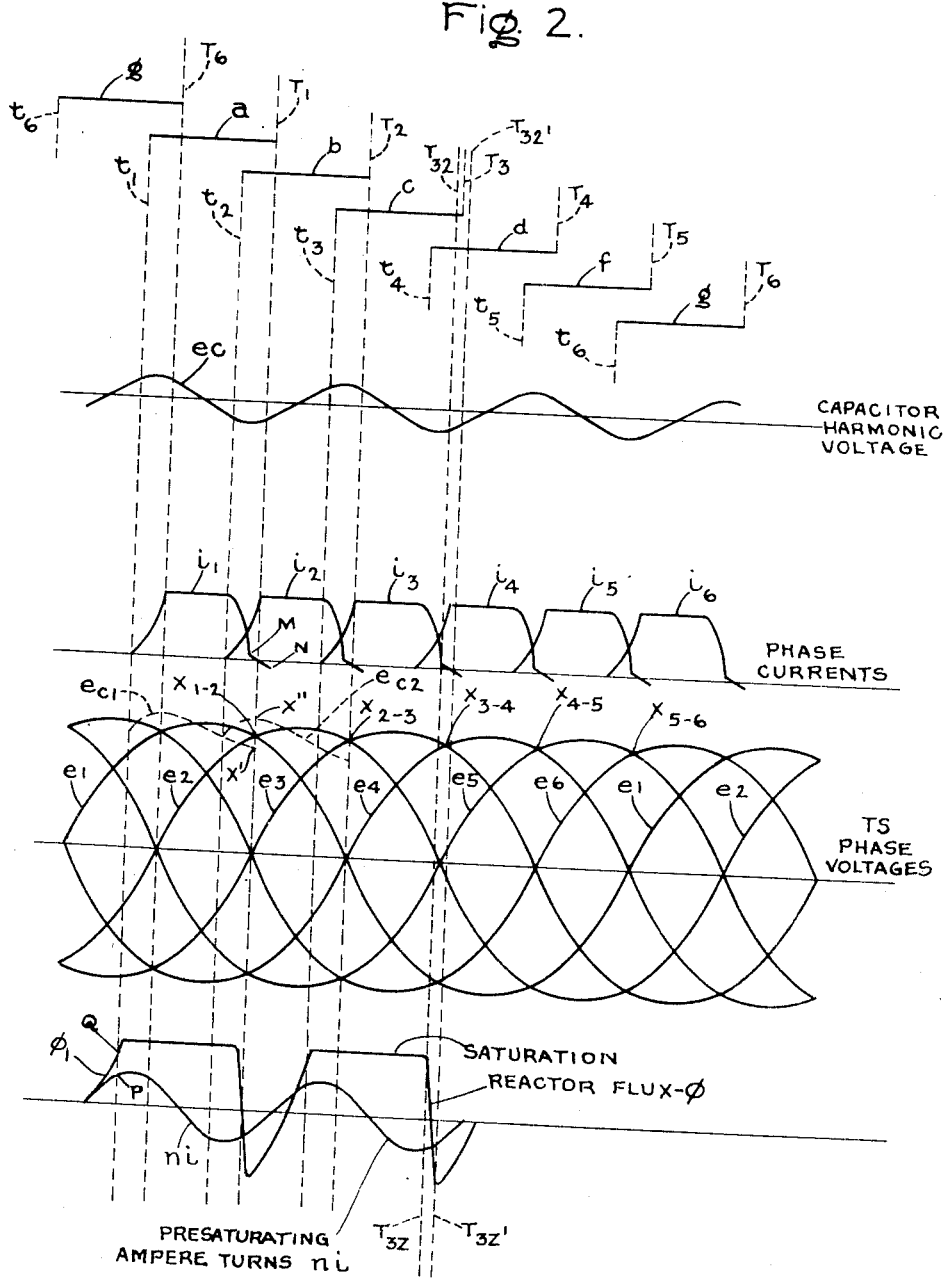

United States Patent Office 2,697,198
Patented Dec. 14, 1954

2,697,198

ELECTRIC CONTACT CONVERTER

August Schmidt, Jr., Schenectady, N. Y., Charles H. Titus, Philadelphia, Pa., and Clodius H. Willis, Princeton, N. J., assignors to General Electric Company, a corporation of New York Application July 5, 1950, Serial No. 172,134

9 Claims. (Cl. 321—48)

This invention relates to electric contact converters and more particularly to an improved commutating reactor and load responsive commutating capacitor combination for improving the commutating action of such converters under variable load conditions.

In mechanical rectifiers having cyclic overlapping commutating contacts, a short circuit in effect is established during the time of contact overlap in order to effect transfer of current from the outgoing phase to the incoming phase which tends to allow very large short circuit currents to circulate between the two phases during the commutating or contact overlap period. In electronic converters this short circuit current is prevented from becoming excessive due to the inherent valve action of the tubes at the current zero. In mechanical overlapping contact rectifiers, there is no such valve action and it is therefore necessary that some means be employed whereby the current in the outgoing phase is limited in magnitude when the outgoing phase contact opens at the end of the commutating or contact overlap period. One arrangement for accomplishing this purpose employs saturable reactors arranged to be unsaturated near the end of the commutating or contact overlap period. When such reactors are unsaturated their impedance is greater than when saturated so that by such means the decaying current in the outgoing phase is maintained at or near its zero value for an appreciable time that is dependent upon the volt-second capacity of the reactors thereby facilitating the interruption of current upon the opening of the contact in each outgoing phase to end the contact overlap period after current is built up in the next incoming phase to be rendered conductive. Whenever the load on a converter with constant contact overlap periods changes and particularly when the load changes rapidly commutation difficulties are aggravated unless relatively large volt-second capacity commutating reactors are employed.

One object of this invention is to provide an improved load responsive commutating system for reducing the duty imposed upon the commutating reactors of mechanical contact converters under varying load conditions.

Another object of the present invention is to facilitate commutation in a mechanical contact type converter by superimposing a precharged capacitor voltage that increases with the load upon the voltage of the alternating current circuits of the converter so as to effectively advance the production of a commutating differential in voltage between the contacts undergoing commutation and thereby accelerate the transfer of the load current from each contact to the next succeeding contact to be rendered conductive proportionately to the increase of the load current.

A further object of this invention is to provide load responsive precharged capacitance means for producing advancement of the commutating voltage for facilitating commutation in a polyphase overlapping contact converter employing load current saturable reactors to insure that effective unsaturation of the load current saturable reactors will occur when the contacts open to end predetermined overlap periods under widely varying load conditions.

A still further object of this invention is the provision of an improved load responsive commutation capacitor precharging arrangement for contact type converters which is particularly adapted for enabling mechanical converters having substantially constant contact overlap periods and relatively small volt-second capacity commutating reactors to be used to supply rapidly changing loads.

Still another object of the present invention is to provide precharged capacitance means for adding an advanced commutating voltage to the alternating voltages of a contact type converter the advancement of which varies in accordance with variations in the load on the converter thereby to improve commutation for rapidly changing load conditions.

In accordance with the invention, energy storage means such as a capacitor is charged at a predetermined polarity during each contact conducting period and such energy storage means is charged at the opposite polarity during the next succeeding contact conducting period. The energy storage means is arranged to be charged proportionately to the load current and is so connected as to increase the instantaneous values of alternating voltage of the incoming phase during the succeeding contact overlap period and to decrease the instantaneous values of such voltage of the outgoing phase during the succeeding contact overlap time for each phase of the alternating current circuit. In this manner, the rate of transfer of current from the rectified contact for each phase of the alternating current circuit to the rectifier contact for the next succeeding phase is made dependent upon the magnitude of the load current. Since the magnitude of the charge supplied to the energy storage means is dependent upon the magnitude of the load current prior to the succeeding overlap period of the contacts the invention is particularly effective as an aid to commutating reactor in controlling the commutation when rapid and substantial load changes occur.

In further accordance with the present invention means including control windings are provided for co-operating with the load current responsive capacitance means in controlling the unsaturation of the load current saturable reactors so as to maintain the current in each phase winding circuit at small instantaneous values for a sufficient time interval after the energy storing capacitance means effects the transfer of the load current therefrom to the succeeding phase winding circuit to include the end of the predetermined closure overlap of the corresponding contacts. As a result of this co-operating relationship the rectifier contacts can open to end predetermined closure overlap periods without deleterious sparking under widely varying load conditions.

For a better understanding of the invention, reference may be had to the accompanying drawings in which Fig. 1 is a schematic representation of a contact converter embodying the invention; Fig. 1a is a schematic representation of a portion of Fig. 1 and is a modification thereof; and in which Fig. 2 is a group of curves drawn to the same time scale for aiding in understanding the arrangement shown in Figs. 1 and 1a.

In Fig. 1, the transfer of energy between the alternating current circuit designated as $E_1$, $E_2$ and $E_3$ and the direct current circuit DC–1 and DC–2 is effected through the switch S, the transformer having a primary winding TP and a secondary winding TS, the contact mechanism C having successive contact overlap periods of constant duration as determined by the shape of the raised portion 8 of cam 7, the saturable reactors $R_1$ and $R_2$, and the harmonic transformer HT.

The primary transformer winding TP is shown as being delta-connected and the secondary winding TS is arranged as a six-phase star connected winding connected so that the energy of phase $1b-4b$ of winding TP, for example, is transferred by transformer action to the winding $1a-4a$ when the arrangement is operated as a rectifier and in the reverse direction when the device is operated as an inverter. The terminals of winding TS are connected to the contacts 1–6 of device C as indicated.

For the purpose of operating the contacts 1–6 in overlapping succession or sequence, a cam member 7 having a raised portion 8 is mounted on the shaft 9 which in turn is driven by the motor M. Motor M is energized from the alternating current circuit and is of the synchronous type. Each of the contacts 1–6 is provided with a biasing spring which biases the contact toward the open position. When the raised portion 8 of cam 7 sequentially engages the contacts 1–6, a circuit is alternately completed from one of the six-phase windings of the secondary winding TS to the conductor 10 and to the conductor 11. It will be observed that with the parts in the position shown, a circuit is completed from the terminal 1a of the winding TS through contacts 1 to conductor 10. Rotation of cam 7 in the counterclockwise direction will subsequently bring raised portion 8 of cam 7 into engagement with contact 2 and hence will close that contact before contact 1 is opened thereby completing a circuit between terminal 2a of winding TS through contacts 2 to conductor 11. Thus, it will be seen that current is drawn from winding TS by sequentially completing a circuit through the appropriate one of the contacts 1–6 so that successive phases 1a, 2a, 3a, 4a, 5a, and 6a of winding TS will supply current through the corresponding successively closed overlapping contacts of device C when the converter is operated as a rectifier. The polyphase windings 7a, 2a, 3a, 4a, 5a, and 6a of the transformer secondary TS have successive phase voltage induced therein and thus will successively supply rectified load current to the direct current circuit DC–1 and 2 as each of the series of contacts 1–6 has circuit connections effective upon the closure of the contact for interconnecting a corresponding phase winding with the load circuit to supply load current thereto during the closure of the contact. Since the contacts 1–6 are sequentially closed and opened by the synchronizing cam 8 in a predetermined overlapping succession or sequence to provide a predetermined closure overlap of the successive contacts, the interconnection of the corresponding successive phase windings with the load circuit will overlap so that each phase winding will be interconnected in shunt or parallel with the succeeding phase winding for transfer of the load current therebetween during the predetermined closure overlap of the corresponding contacts. It will also be observed that conductors 10 and 11 as well as the commutating reactors $R_1$ and $R_2$ are alternately energized, for example, conductor 10 and reactor $R_1$ are energized upon closing of contacts 1, 3 and 5 and conductor 11 and reactor $R_2$ are energized upon closing of contacts 2, 4 and 6. Current supplied to conductor 10 is fed through the saturable reactor $R_1$ and through the left-hand portion of the harmonic auto-transformer HT to the direct current line DC1 when the device is being operated as a rectifier and in the reverse direction when the device is operated as an inverter. It will also be observed that current is allowed to flow between conductor 11 and the direct current conductor DC–1, through the saturable reactor $R_2$ and through the right-hand portion of the harmonic auto-transformer HT.

Saturable reactor $R_1$ is for the purpose of maintaining the outgoing phase current at small instantaneous values for an appreciable time during which time the contacts 1, 3 and 5 may be opened to end each corresponding contact overlap period under normal load conditions without difficulty. Likewise, the reactor $R_2$ is for the purpose of facilitating the interruption of current flow when contacts 2, 4 and 6 are opened to end each corresponding contact overlap period under normal load conditions. These reactors may be provided respectively with control windings 12 and 13 which are energized from a source of alternating current potential such as the generator G driven by the motor M through shaft 9. Current from generator G to windings 12 or 13 may be regulated by the adjustable impedance 14. By suitable adjustment of the device 14, a degree of pre-saturation of reactors $R_1$ and $R_2$ can be established so that the build-up of normal full load current through the main winding of reactors $R_1$ and $R_2$ is facilitated due to the reduced impedance of these components caused by saturating current through windings 12 and 13. When the current in these reactors $R_1$ and $R_2$ is reduced or caused to change polarity near the end of the contact overlap period, the reactors become unsaturated and as a result their impedance will be increased substantially. This increased impedance can be effectively utilized to limit the current flow in the outgoing phase through the associated one of the contacts 1–6 to a low value when the contacts are opened to end the corresponding contact overlap periods. The magnetizing ampere turns due to coils 12 and 13 are represented in Fig. 2 by the curve $ni$ and the flux condition of one of the reactors $R_1$ or $R_2$ is represented by the curve $\phi_1$. Thus at time $t_1$, the presaturating ampere turns are represented by the point P and the flux $\phi_1$ is represented by the point Q. At point Q, reactor $R_1$ is almost saturated so that build-up of current through contacts 1 is facilitated.

The horizontal lines $g$, $a$, $b$, $c$, $d$, $f$, and $g$, overlap in time to indicate the corresponding contact overlap periods during which any two successively operated contacts are both closed. For example, the line designated as $a$ represents the closed condition of contacts 1 and the line labeled $b$ represents the closed condition of contacts 2. Thus, both contacts 1 and 2 are closed during the contact overlap interval of time beginning at $t_2$ and ending at $T_1$ which time is the commutating period during which the load current flow is decreased in the outgoing phase and built up in the incoming phase. Such transfer of the load current requires some little time due to the inductance inherent in the phase circuits. During this period, the presaturating ampere turns $ni$ have a negtive value and hence tend to unsaturate the reactor $R_1$ when the current in phase 1 has decreased to such a value that the ampere turns in windings $R_1$ and 12 are approximately equal. This effect causes an increase in the impedance of reactor $R_1$ and slows the decay of current $i_1$. In the same manner, the flux condition of reactor $R_2$, is controlled by the magnetizing and demagnetizing effects of coil 13. The instantaneous values of current between points M and N of curve $i_1$ are low in magnitude relative to the maximum instantaneous values of the current curve $i_1$ and hence interruption of current flow when contact 1 is opened at a time such as $T_1$ is facilitated.

For the purpose of accelerating the transfer of current from one of the contacts such as 1 to another of the contacts such as 2 against the inherent retarding action of the phase circuit inductance during each constant contact overlap period, the energy storage device HC is used. To accomplish this purpose in accordance with the present invention, an energy storing capacitance means is interconnected upon successive closure of contacts 1–6 in effective series or load current responsive relation with the phase windings and the direct current circuit so as to accumulate charges of opposite polarity proportional to the value of the load current flowing in the direct current circuit from successive phase windings during the separate closure of the corresponding contacts and thereby produce voltages effective to transfer a corresponding value of load current from each phase winding to the succeeding phase winding upon parallel interconnection thereof during the predetermined closure overlap of the corresponding contacts. As shown in Fig. 1, the energy storing circuit means comprises a capacitor HC having an inductive device HT that is utilized for interconnecting the capacitor HC in load current responsive relation (i. e. effective series circuit relation) with the phase windings controlled by the contacts 1–6 so as to accumulate the charges of opposite polarity proportional to the value of load current flow from the successive phase windings. This harmonic capacitor is interconnected between the conducting paths comprising reactors $R_1$ and $R_2$ and hence accumulates a charge of one polarity proportional to the current flowing through reactor $R_1$ and conductor 10 prior to the succeeding contact overlap period and of opposite polarity proportional to the flow of current through reactor $R_2$ and conductor 11 prior to the next succeeding contact overlap period. This is due to the fact that when current flows from reactor $R_1$ through the left-hand end of the winding of harmonic transformer HT to the line DC1, the polarity of the capacitor changing current induced by this winding will be positive on the left-hand terminal and negative on the right-hand terminal thus causing the polarity of capacitor HC at point A to be positive and at point B to be negative. The charge accumulated on the capacitor plates is represented by the curve $ec$ in Fig. 2 and is proportional to the load current. When contact 1 is closed, the driving voltage across winding $e_1$ of the secondary winding TS is represented by the curve $e_1$ in Fig. 2. If the voltage represented by the curve $ec$ is added algebraically to the voltage of curve $e_1$, the resultant voltage may be represented as in Fig. 2 by the dotted line curve $e_{c1}$. In Fig. 2, it will be observed that at the time $T_6$ current through contacts 1 is a maximum value and remain so until time $t_2$. During this period of maximum values for current $i_1$, the voltage $ec$ is caused to change in polarity from a positive value through zero to a negative value so that at time $T_1$ the effective voltage of curve $e_1$ is represented by the point X' which point is less positive than the point $X_{1-2}$ which would be representative of the voltage $e_1$ at time $T_1$ if the voltage $ec$ were not added. Thus, it will be seen that the effective voltage tending to maintain current flow through contacts 1 and associated components is reduced at time $T_1$ when contacts 1 are opened. Since the magnitude of the voltage $ec$ is increased with an increase of load current, the function of capacitor HC is particularly effective and useful during rapidly changing load conditions. In this way, the interruption of current flow through contacts 1 is facilitated. The point $X'$ is less positive than the point $X_{1-2}$ due to the accumulation of a positive opposing charge at terminal A of capacitor HC. The negative charge of terminal B of capacitor HC in effect increases the value of voltage $e_2$ at time $T_1$ so that the effective voltage causing build-up of current $i_2$ is represented by the point $X''$ rather than by point $X_{1-2}$. The voltage which facilitates the build-up of current through contacts 2 and conductor 11 is represented in Fig. 2 by the dotted line curve $ec_2$. It will be understood that the voltage represented by the dotted line curves $ec_1$ and $ec_2$ are both due to the charge accumulated on capacitor HC and that the potential of terminal A of capacitor HC is represented by point $X'$ of Fig. 2 and that the voltage of terminal B of capacitor HC is represented by the point $X''$ of Fig. 2 at time $T_1$. It will further be understood that the potential of point A effectively diminishes the voltage of curve $e_1$ during the commutating period between time $t_2$ and time $T_1$ and that the potential of point B in effect increases the potential of curve $e_2$ during this same period so that current decay in reactor $R_1$ is facilitated and current build-up through reactor $R_2$ is aided during the commutating period represented by the time from $f_2$ to the time $T_1$.

Thus it will be understood upon referring to Fig. 2 that at the beginning of the contact overlap time $t_2$ the composite voltage $ec1$ resulting from the imposition of the condenser voltage on the phase voltage $e1$ when the capacitor HC is charged by the load current of the particular value indicated is exactly equal to the composite voltage $ec2$ resulting from the imposition of the opposite condenser voltage upon the phase voltage $e2$. Thereafter the composite voltage $ec1$ decreases while the composite voltage $ec2$ increases. This produces an increasing differential between the two composite voltages which is effective to produce commutation of the load current from phase 1 to phase 2. In other words, this voltage differential produces the transfer of the load current $i1$ from contact $a$ to contact $b$ which is closed in overlapping relation with contact $a$ from time $t_2$ to time $T1$. As a result, as shown in Fig. 2 at time $t_2$ the outgoing phase current $i1$ begins to decrease and the incoming phase current $i1$ begins to increase. Such commutation or transfer of the load current is produced entirely by the differential between the voltages $ec_1$ and $ec_2$. Thus when the end of the contact overlap time T1 is reached at which contact $a$ is opened, all of the load current has been transferred from phase 1 to phase 2 due to the composite voltage differential and the saturable reactor R1 then becomes unsaturated and therefore effective at point $m$ to maintain the current $i1$ in the outgoing phase 1 near or at the zero value until the contact 1 is opened at time T1 to end the contact overlap period. Thus even though a considerable voltage differential is produced between the overlapping contacts at the end of the contact overlap period as represented by the different points $X'$ and $X''$ such voltage is effective to overcome the circuit inductance and decrease the flow of load current in the outgoing phase to substantially zero and build up the load current in the incoming phase. As a result only a relatively small volt-second capacity commutating reactor is required to maintain the current in the outgoing phase at or near its zero value when the outgoing phase contact is opened to end the contact overlap period.

In case the load current should increase materially then the charge accumulated by the condenser HC will increase correspondingly and thereby produce a correspondingly larger differential between the composite voltages $ec1$ and $ec2$. Hence the correspondingly larger voltage differential will be effective to complete the commutation or transfer of the increased load current from phase 1 to phase 2 during the same constant contact overlap period. By thus super-imposing the load responsive condenser voltage on the phase voltage, a marked improvement in commutation is obtained, since this enables a saturable reactor of a given capacity to successfully maintain the outgoing phase current at or near the zero value for the required time near the end of the contact overlap period irrespective of variations in the load current value. Otherwise, a larger volt-second capacity and size reactor and longer commutating contact overlap periods would be required. In like manner transfer of current from contacts 3 and 5 to contacts 4 and 6 respectively is facilitated. Since the frequency of the voltage $ec$ is three times the frequency of the voltages $e_1$–$e_6$, the commutating voltage $ec$ can be aptly termed a harmonic commutating voltage. The frequency of the voltage $ec$ is determined by the number of contacts and the harmonic voltage will change from one polarity to another polarity between any two successive commutating periods. When terminal B of capacitor HC is positive and terminal A is negative transfer of current from contacts 2, 4 and 6 to contacts 3, 5 and 1 respectively is likewise facilitated.

Instead of using an auto-transformer such as HT of Fig. 1 with the capacitor HC connected across the end terminals of transformer HT, a transformer such as is shown in Fig. 1a could be used. The circuit for Fig. 1a would be substituted for the portion of Fig. 1 which is enclosed by dotted lines. In Fig. 1a a transformer HT–1 having a primary winding 15 and a secondary winding 16 is used. The capacitor HC may be connected across the secondary winding 16 of transformer HT–1. With the arrangement of Fig. 1 or the arrangement of Fig. 1a, the capacitor HC is magnetically coupled with the portion of the winding of transformer HT which is conducting current at a particular instant.

Since the magnitude of the instantaneous values of the voltage $ec$ is a function of the magnitude of the currents $i_1$–$i_6$ and of the time during which such currents are allowed to flow, it will be understood that the invention is particularly applicable to converters whose current conditions vary rapidly and within wide limits.

While particular embodiments of the invention have been shown and described, it will be obvious to those skilled in the art that various changes and modifications may be made without departing from the invention in its broader aspects and, it is, therefore, intended in the appended claims to cover all such changes and modifications as fall within the true spirit and scope of the invention.

What we claim as new and desire to secure by Letters Patent of the United States is:

1. In combination, polyphase alternating current supply windings, a direct current circuit, means including a plurality of contacts arranged to be closed in overlapping sequence for synchronously connecting successive phase windings to supply current to the direct current circuit, first and second conductors forming alternate conducting paths for the flow of current from successive phase windings to the direct current circuit, said conductors being connected to said contacts so as to be alternately energized in response to the sequential operation of said contacts, an inductive device interconnected between said conductors and having a mid-connection with the direct current circuit whereby one portion of said device is energized by the current in said first conductor and another portion of said device is energized by the current in said second conductor, capacitance means interconnected between said conductors and operative to accumulate a charge of one polarity proportional to current flowing through said first conductor and of opposite polarity proportional to current flowing through said second conductor whereby the charged condition of said capacitance means provides a voltage variably effective to transfer current from each phase winding to the succeeding phase winding in proportion to the load current, variable impedance means in series with each of said conductors, and means for controlling the impedance of said variable impedance means so that the current through the associated conductor is maintained at low instantaneous values when the transfer of current from each corresponding phase winding to the succeeding phase winding is completed.

2. In combination, polyphase alternating current supply windings, a direct current circuit, switching means including a plurality of contacts, each contact having circuit connections effective upon the closure thereof for interconnecting a corresponding phase winding with the direct current circuit to supply load current thereto, synchronous means for closing and opening the contacts in a predetermined sequence to supply current from successive phase windings and provide a predetermined closure overlap of the corresponding contacts, first and second conductors interconnected with the contacts to form alternate conducting paths for the flow of current to the direct current circuit from the successive phase windings so as to be alternately energized in response to the sequential closure of said contacts, an inductive device having a first and second winding, said first winding being interconnected between said conductors, one portion of said first winding being energized by the current in said first conductor and another portion of said first winding being energized by the current in said second conductor, and capacitance means connected across said second winding and operative to accumulate a charge of one polarity proportional to current flowing through said first conductor and of opposite polarity proportional to current flowing through said second conductor whereby the charged condition of said capacitance means provides a voltage variably effective to transfer current from each phase winding to the succeeding phase winding during the closure overlap of the corresponding contacts in proportion to the load current, variable impedance means in series with each of said conductors, and means for controlling the impedance of said variable impedance means so that the current through the associated conductor is maintained at low instantaneous values when the transfer of load current from each phase winding to the succeeding phase winding is completed during the closure overlap of the corresponding contacts.

3. In combination, polyphase alternating current supply windings, a direct current circuit, switching means including a plurality of contacts, each contact having circuit connections effective upon the closure thereof for interconnecting a corresponding phase winding with the direct current circuit to supply load current thereto, synchronous means for closing and opening said contacts in a predetermined overlapping sequence to supply current from successive phase windings, first and second conductors interconnected with said contacts to form alternate conducting paths for the flow of current to the load circuit from the successive phase windings so as to be alternately energized in response to the sequential closure of said contacts, an inductive device interconnected between said conductors and having a mid-connection with the load circuit whereby one portion of said device is energized by the current in said first conductor and another portion of said device is energized by the current in said second conductor, and capacitance means inductively coupled with said device and operative to accumulate a charge of one polarity proportional to current flowing through said first conductor and of opposite polarity proportional to current flowing through said second conductor whereby the charged condition of said capacitance means provides a voltage variably effective during the transfer of current from one to the other of said conductors to oppose the flow of current in said one conductor and to facilitate the flow of current in said other conductors in proportion to the load current.

4. In combination, a polyphase alternating current rectifier having a direct current load circuit provided with synchronous switching means including a series of contacts opened and closed in a sequence to provide a predetermined closure overlap of the successive contacts and polyphase windings having successive phase voltages induced therein and interconnected with the contacts to successively supply load current to the direct current circuit during the successive closures of the corresponding contacts, saturable reactor means having connections with the contacts for successive saturation by the load current supplied from successive phase windings to the direct current circuit, energy storing capacitance means having connections controlled by the contacts for enabling the capacitance means during the separate closure of the successive contacts to accumulate charges of opposite polarity proportional to the value of the load current flow from the corresponding phase windings to the direct current circuit and for enabling the capacitance means to apply the voltages produced by said charges to transfer the flow of a corresponding value of load current from each phase winding to the succeeding phase winding during the predetermined closure overlap of the corresponding contacts, and means including control windings for controlling the unsaturation of the successively saturable reactor means to maintain the current in each phase winding at small instantaneous values for a sufficient time interval after the capacitance means effects the transfer of the load current therefrom to the succeeding phase winding to include the end of the predetermined closure overlap of the corresponding contacts.

5. A rectifier having in combination, polyphase windings having successive phase voltages induced therein, a direct current load circuit, switching means including a series of contacts, each contact having circuit connections effective upon the closure thereof for interconnecting a corresponding phase winding with the load circuit to supply load current thereto, synchronizing mechanism for periodically closing and opening the contacts in a predetermined sequence to supply load current from successive phase windings and provide a predetermined closure overlap of the corresponding contacts, saturable reactor means having connections with the contacts for successive saturation by the load current supplied from the successive phase windings to the direct current circuit, capacitance means having connections controlled by the contacts for enabling the capacitance means upon successive closure of the contacts to accumulate charges proportional to the value of the load current flow in the direct current circuit and for enabling the capacitance means to apply the voltages produced by said charges to transfer a corresponding value of load current from each phase winding to the succeeding phase winding during the predetermined closure overlap of the corresponding contacts, and means including control windings for controlling the unsaturation of the successively saturable reactor means to maintain the current in each phase winding at small instantaneous values for a sufficient time interval after the capacitance means effects the transfer of the load current therefrom to the succeeding phase winding to include the end of the predetermined closure overlap of the corresponding contacts.

6. An alternating current rectifier having in combination, polyphase windings having successive phase voltages induced therein, a direct current load circuit, switching means including a series of contacts, each contact having connections effective upon the closure of the contact for interconnecting a corresponding phase winding to supply load current through the contact to the direct current circuit, saturable reactor means having connections with the contacts for successive saturation by the load current supplied from the successive phase windings to the direct current circuit, synchronizing mechanism for periodically closing and opening the contacts in a predetermined overlapping succession to periodically interconnect each phase winding in parallel with the succeeding phase winding during the predetermined closure overlap of the corresponding contacts, capacitance means having connections controlled by the contacts for charging the capacitance means proportional to the value of the load current flow through the contacts during the separate closure of the contacts and for applying the resulting capacitance voltage to transfer a corresponding value of load current from each phase winding to the succeeding phase winding during the predetermined closure overlap of the corresponding contacts, and means including control windings for controlling the unsaturation of the successively saturable reactor means to maintain the current in each phase winding at small instantaneous values for a sufficient time interval after the capacitance means effects the transfer of the load current therefrom to the succeeding phase winding to include the end of the predetermined closure overlap of the corresponding contacts and for oppositely presaturating the reactor means after the end of the closure overlap of the corresponding contacts.

7. An alternating current rectifier having in combination, polyphase windings having successive phase voltages induced therein, a direct current load circuit, switching means including a series of contacts, each contact having connections effective upon the closure of the contact for interconnecting a corresponding phase winding with the load circuit to conduct load current thereto through the contact, saturable reactor means having connections with the contacts for successive saturation by the load current supplied from the successive phase windings to the direct current circuit, contact operating mechanism synchronized with the voltages of the polyphase windings for periodically closing and opening the contacts in a predetermined overlapping succession to overlap the interconnection of successive phase windings with the load circuit and thereby interconnect each phase winding in shunt with the succeeding phase winding during a predetermined closure overlap of the corresponding contacts, capacitance means having connections controlled by the contacts to successively accumulate charges of opposite polarity proportional to the value of the load current flowing in the direct current circuit during predetermined contact conductive periods and to apply the resulting voltages to transfer a corresponding value of load current from the corresponding phase winding to the succeeding phase winding upon the shunt interconnection thereof during the predetermined closure overlap of the corresponding contacts, and means including control windings for controlling the unsaturation of the successively saturable reactor means to maintain the current in each phase winding at small instantaneous values for a sufficient time interval after the capacitance means effects the transfer of the load current therefrom to the succeeding phase winding to include the end of the predetermined closure overlap of the corresponding contacts and for oppositely presaturating the reactor means after the end of the closure overlap of the corresponding contacts.

8. An alternating current rectifier having in combination, polyphase windings having successive phase voltages induced therein, a direct current load circuit, switching means including a series of contacts, each contact having connections effective upon the closure thereof for interconnecting a corresponding phase winding with the load circuit to supply load current thereto through the contact, mechanism synchronized with the voltages of the windings for periodically closing and opening the contacts in a predetermined overlapping succession to supply load current from successive phase windings and periodically interconnect each phase winding in parallel with the succeeding phase winding during a predetermined closure overlap of the corresponding contacts, saturable reactor means having connections with the contacts for successive saturation by the load current supplied from the successive phase windings to the direct circuit, capacitance means having connections controlled by the contacts to periodically accumulate charges of opposite polarity proportional to the value of the load current flow from successive phase windings to the direct current circuit during the successive closure of the contacts and to apply the resulting voltages to transfer a corresponding value of load current from each phase winding to the succeeding phase winding upon the parallel interconnection thereof during the predetermined closure overlap of the corresponding contacts, and means including control windings for controlling the unsaturation of the successively saturable reactor means to maintain the current in each phase winding at small instantaneous values for a sufficient time interval after the capacitance means effects the transfer of the load current therefrom to the succeeding phase winding to include the end of the predetermined closure overlap of the corresponding contacts and for oppositely presaturating the reactor means after the end of the closure overlap of the corresponding contacts.

9. An alternating current rectifier having in combination, polyphase windings having successive phase voltages induced therein, a direct current load circuit, switching means including a series of contacts, each contact having circuit connections effective upon the closure of the contact for interconnecting a corresponding phase winding with the load circuit to supply load current thereto, saturable reactor means having connections with the contacts for successive saturation by the load current supplied from the successive phase windings to the direct current circuit, mechanism synchronized with the voltages of the windings for periodically closing and opening the contacts in a predetermined overlapping succession to interconnect each phase winding in parallel with the succeeding phase winding during a predetermined closure overlap of the corresponding contacts, a capacitor having an inductive device for interconnecting the capacitor with the successive phase windings controlled by the contacts to periodically and oppositely charge the capacitor proportional to the value of the load current flow upon successive closure of the contacts to produce voltages effective to transfer a corresponding value of load current from each phase winding to the succeeding phase winding during the predetermined closure overlap of the corresponding contacts, and means including control windings for controlling the unsaturation of the successively saturable reactor means to maintain the current in each phase winding at small instantaneous values for a sufficient time interval after the capacitance means effects the transfer of the load current therefrom to the succeeding phase winding to include the end of the predetermined closure overlap of the corresponding contacts, and for oppositely presaturating the reactor means after the end of the closure overlap of the corresponding contacts.

References Cited in the file of this patent

UNITED STATES PATENTS

| Number | Name | Date |
|---|---|---|
| 1,183,883 | Koppitz | May 23, 1916 |
| 1,929,720 | Willis | Oct. 10, 1933 |
| 1,929,721 | Willis | Oct. 10, 1933 |
| 1,929,722 | Willis | Oct. 10, 1933 |
| 1,929,723 | Willis | Oct. 10, 1933 |
| 1,929,724 | Willis | Oct. 10, 1933 |
| 1,929,725 | Willis | Oct. 10, 1933 |
| 1,929,726 | Willis | Oct. 10, 1933 |
| 1,929,727 | Willis | Oct. 10, 1933 |
| 1,952,062 | Fecker | Mar. 27, 1934 |
| 2,036,844 | Willis | Apr. 7, 1936 |
| 2,141,921 | Lenkert | Dec. 27, 1938 |
| 2,182,628 | Janetschke | Dec. 5, 1939 |
| 2,209,806 | Bedford | July 30, 1940 |
| 2,220,747 | Westendorp | Nov. 5, 1940 |
| 2,241,050 | Bedford et al. | May 6, 1941 |
| 2,284,794 | Bedford | June 2, 1942 |
| 2,310,792 | Koppelmann | Feb. 9, 1943 |
| 2,351,975 | Koppelmann | June 20, 1944 |
| 2,476,068 | Short | July 12, 1949 |